(12) United States Patent
Rowles et al.

(10) Patent No.: US 8,346,923 B2
(45) Date of Patent: Jan. 1, 2013

(54) METHODS FOR IDENTIFYING AN APPLICATION AND CONTROLLING ITS NETWORK UTILIZATION

(75) Inventors: David Rowles, Oxfordshire (GB); Clifford Penton, Abingdon (GB)

(73) Assignee: Sophos PLC, Abingdon (GB)

( * ) Notice: Subject to any disclaimer, the term of this patent is extended or adjusted under 35 U.S.C. 154(b) by 0 days.

(21) Appl. No.: 12/269,350

(22) Filed: Nov. 12, 2008

(65) Prior Publication Data
US 2010/0121964 A1 May 13, 2010

(51) Int. Cl.
*G06F 15/173* (2006.01)
(52) U.S. Cl. .................................. 709/225; 709/233
(58) Field of Classification Search .................. None
See application file for complete search history.

(56) References Cited

U.S. PATENT DOCUMENTS

| | | | |
|---|---|---|---|
| 5,689,708 A | 11/1997 | Regnier et al. | |
| 5,983,261 A * | 11/1999 | Riddle | 709/204 |
| RE39,135 E * | 6/2006 | Riddle | 709/204 |
| 7,664,034 B1 * | 2/2010 | Eatough et al. | 370/235 |
| 2002/0110084 A1 * | 8/2002 | Butt et al. | 370/230 |
| 2004/0107360 A1 * | 6/2004 | Herrmann et al. | 713/201 |
| 2004/0143663 A1 * | 7/2004 | Leedom et al. | 709/226 |
| 2007/0143851 A1 * | 6/2007 | Nicodemus et al. | 726/25 |
| 2007/0226775 A1 * | 9/2007 | Andreasen et al. | 726/1 |
| 2007/0280105 A1 * | 12/2007 | Barkay et al. | 370/229 |
| 2008/0158337 A1 * | 7/2008 | Richardson | 348/14.09 |
| 2008/0273553 A1 * | 11/2008 | Wang et al. | 370/468 |
| 2008/0276000 A1 * | 11/2008 | Motte et al. | 709/233 |
| 2009/0019162 A1 * | 1/2009 | Riddle | 709/226 |

* cited by examiner

*Primary Examiner* — Ario Etienne
*Assistant Examiner* — Clayton R Williams
(74) *Attorney, Agent, or Firm* — Strategic Patents, P.C.

(57) ABSTRACT

In embodiments of the present invention improved capabilities are described for improving network quality of service, such as through controlling the bandwidth consumed by a client computing facility. To affect this, the software applications operating through the client computing facility may be identified to determine which applications are requesting network access, and confirming which are permitted only restricted bandwidth when making network communications. The requesting software application that is permitted only restricted bandwidth may then be allowed to make the network communications through a bandwidth restricted network connection.

19 Claims, 4 Drawing Sheets

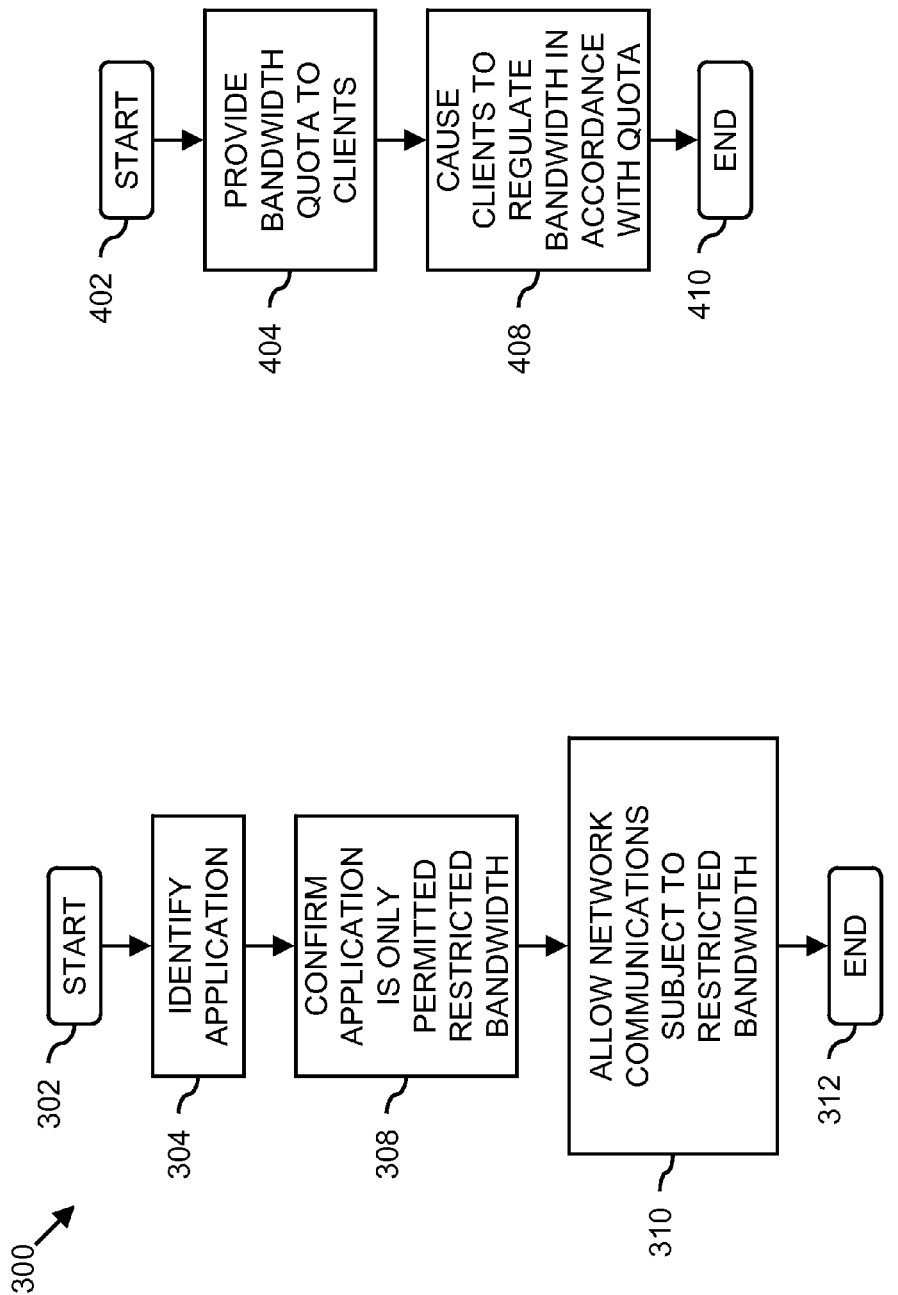

METHODS FOR IDENTIFYING AN APPLICATION AND CONTROLLING ITS NETWORK UTILIZATION

BACKGROUND

1. Field

The present invention is related to network utilization.

2. Description of the Related Art

In packet-switched networks, quality of service policies may be applied to communications of computer applications.

Different quality of service policies may be appropriate for different client applications, or for different communications of a single client application.

There remains a need for managing, deploying, and enforcing different quality of service policies for a plurality of client applications, the client applications perhaps deployed across a plurality of client computers.

SUMMARY

Embodiments of the present invention assist in managing, deploying, and enforcing different quality of service policies for a plurality of client applications, the client applications perhaps deployed across a plurality of client computers. The quality of service may be based upon an application's name, type, categorization, or the like.

In one aspect, a method of controlling network bandwidth consumed by a client computing facility that is disclosed herein includes identifying which of a plurality of software applications operating through the client computing facility is requesting network access; confirming that the requesting software application is only permitted restricted bandwidth when making network communications; and allowing the requesting software application to make the network communications through a bandwidth restricted network connection. The step of confirming that the requesting software application is only permitted restricted bandwidth may involve accessing a network access policy that is resident on the client computing facility. The step of confirming that the requesting software application is only permitted restricted bandwidth may involve accessing a network access policy that is remote from the client computing facility. The bandwidth restricted network connection may be regulated at a client firewall by controlling a rate at which individual data components of the network communication are sent and received. The step of allowing the requesting software application to make the network communications through the bandwidth restricted connection may further include regulating the bandwidth of the bandwidth restricted network connection based on a time of day. The step of allowing the requesting software application to make the network communications through the bandwidth restricted connection may further include regulating the bandwidth of the bandwidth restricted network connection based on a predetermined quota. The predetermined quota may be a predetermined quota for a predetermined time period.

In one aspect, a method of controlling network bandwidth that is disclosed herein includes providing to a plurality of client computing facilities a network accessibility bandwidth quota for a restricted availability software application operated through a client computing facility; and causing each of the plurality of client computing facilities to regulate a bandwidth restricted network connection accessed by the restricted availability software application in accordance with the network accessibility bandwidth quota. The quota may establish a quota within certain timeframes in a day. The quota may be established in accordance with a corporate policy. The corporate policy may be maintained, at least in part, through a network based threat management facility. The quota may be updated through a network based threat management facility in accordance with an updated corporate policy. The restricted availability software application may be a server based software application. The restricted availability software application may be a client based software application. The restricted availability software application may be a gaming software application. The restricted availability software application may be an instant messaging software application. The restricted availability software application may be a VoIP software application. The restricted availability software application may be a video software application. The restricted availability software application may be a music software application.

In one aspect, a method of controlling network bandwidth that is disclosed herein includes providing to a plurality of client computing facilities a network accessibility bandwidth parameter for a restricted availability software application operated through a client computing facility; and causing each of the plurality of client computing facilities to regulate a bandwidth restricted network connection accessed by the restricted availability software application in accordance with network accessibility parameter. The network accessibility parameter may relate to currently available network bandwidth. The network accessibility parameter may relate to a time of day.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 3 depicts a flow diagram of a method for controlling network bandwidth consumed by a client computing facility.

FIG. 4 depicts a flow diagram of a method for controlling network bandwidth.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
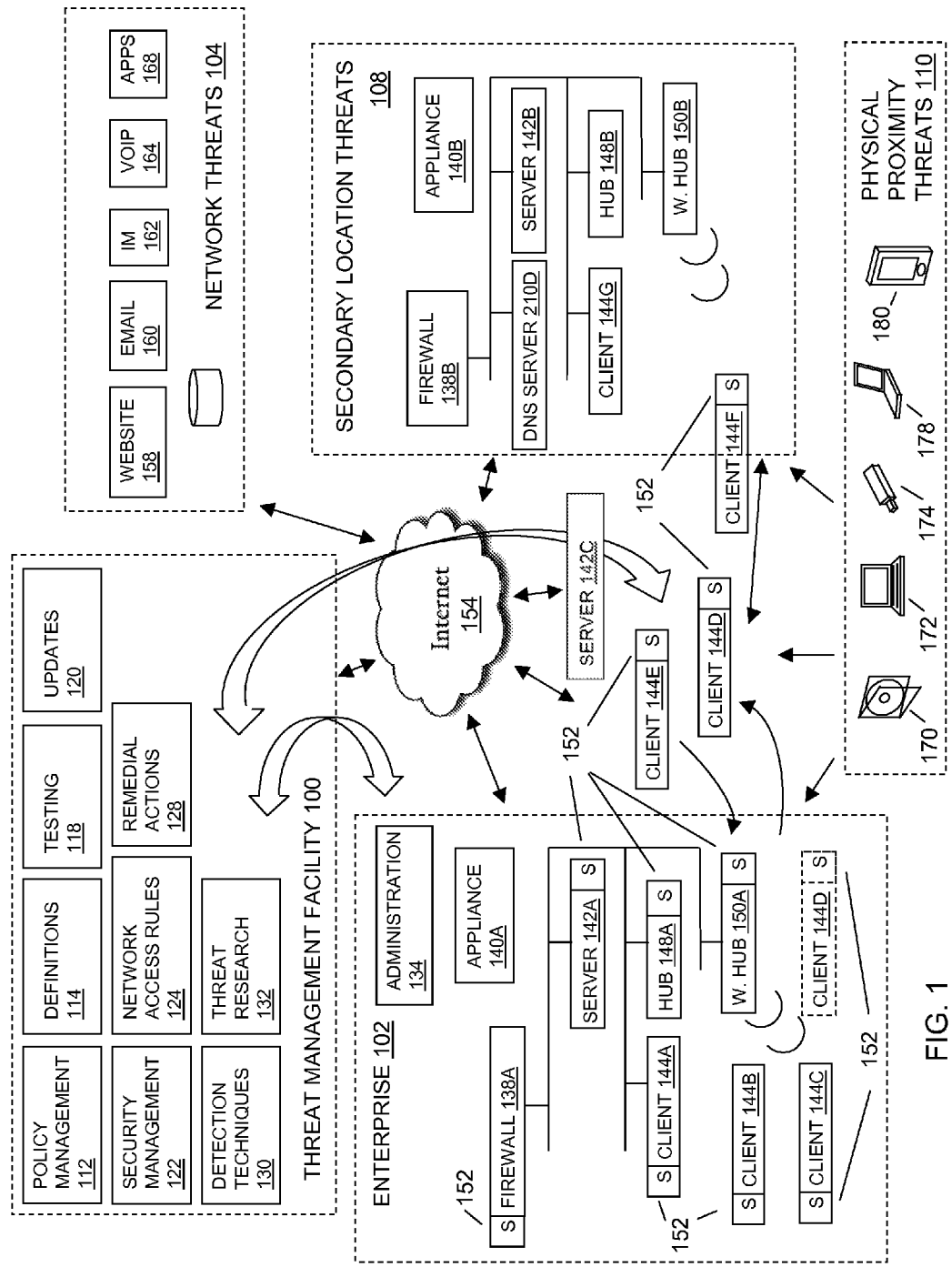
FIG. 1 depicts a block diagram of a threat management facility providing protection to an enterprise against a plurality of threats.

FIG. 1 depicts a block diagram of a threat management facility providing protection to an enterprise against a plurality of threats. An aspect of the present invention relates to corporate policy management and their implementation through a unified threat management facility 100. As will be explained in more detail below, a threat management facility 100 is used to protect computer assets from many threats, both computer generated threats and user generated threats. The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services and policy management may be offered as one of the services. We will now turn to a description of the threat management system 100

Over recent years, malware has become a major problem across the internet 154. From both technical and user perspectives the categorization of a specific threat type, such as whether it is a virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats. The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly, say within 10 minutes, which may require acceleration for the delivery of threat protection. Where once, monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 depicts a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include enterprise facility 102 client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly with the threat management facility 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the distribution of enterprise facility 102 wide access rules and policies that may maintain control of the access of client facility 144 to enterprise facility 102 network resources. The policies may be defined for application type, subset of application capabilities, organization hierarchy, computer facility type, user type, network location, time of day, connection type, or the like.

Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a standalone application, may be part of the policy management facility 112, network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change enterprise facility 102, client facility 144, server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The IDE definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the network access rules facility 124. The network access rules facility 124 may be maintained by the network administration facility 134 using the network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, DNS server facility 210, administration facility 134, firewall 138, gateway, hubs 148, routers, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like, such as a user's desktop computer as an end-point computer, a firewall as a data evaluation end-point computer system, a laptop as a mobile end-point computer, a PDA as a hand-held end-point computer. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs 148, routers, server facility 142, DNS server facility 210, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facility 142, such as application servers 142, communications servers 142, file servers 142, database servers 142, proxy servers 142, mail servers 142, fax servers 142, game servers 142, web servers 142, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs 148, gateways, print servers 142, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the routers and hubs 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148 or wireless network facilities 150. Client facilities 144 connected to the enterprise facility 102 network via a wired facility 148 or wireless facility 150 may receive similar protection, as both connection types are ultimately connected to the same enterprise facility 102 network, with the same end-point computer security facility 152, and the same threat protected enterprise facility 102 environment. Mobile wireless facility 150 clients 144, because of their ability to connect to any wireless 150 network access point, may connect to the internet 154 outside the enterprise facility 102, and therefore outside the threat-protected environment of the enterprise facility 102. In this instance the mobile client facility 144, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144 that has an embedded end-point computer security facility 152, such as by providing URI filtering in personal routers, using a web appliance as a DNS proxy, or the like. Mobile client facilities 144 that are components of the enterprise facility 102 but temporarily outside connectivity with the enterprise facility 102 network, may be provided with the same threat protection and policy control as client facilities 144 inside the enterprise facility 102. In addition, mobile client facilities 144 may receive the same interactions to and from the threat management facility 100 as client facilities 144 inside the enterprise facility 102, where mobile client facilities 144 may be considered a virtual extension of the enterprise facility 102, receiving all the same services via their embedded end-point computer security facility 152.

Interactions between the threat management facility 100 and the components of the enterprise facility 102, including mobile client facility 144 extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise facility 102 client facility 144 equipped with an end-point computer security facility 152, but in embodiments, as long as the mobile client facility 144 is embedded with an end-point computer security facility 152, as described above, threats may have no better success than if the mobile client facility 144 where inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144 is in a secondary location 108 or connecting wirelessly 150 to a non-enterprise facility 102 wireless internet 154 connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138, servers 142, clients 144, hubs 148, wireless hubs 150, and the like. As a result, the computer components of the secondary location 108 may be open to threat attacks, and become potential sources of threats, as well as any mobile enterprise facility 102 clients 144 that may be connected to the secondary location's 108 network. In this instance, these computer components may now unknowingly spread a threat to other components connected to the network.

Some threats may not come directly from the Internet 154, such as from non-enterprise facility 102 controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility 150 connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of embodiments providing computer-based network Quality of Service (QoS) based upon application type/categorization. It should be understood that the following embodiments may be managed through a threat management facility 100 along with other services, such as those described herein.

Figure 2:
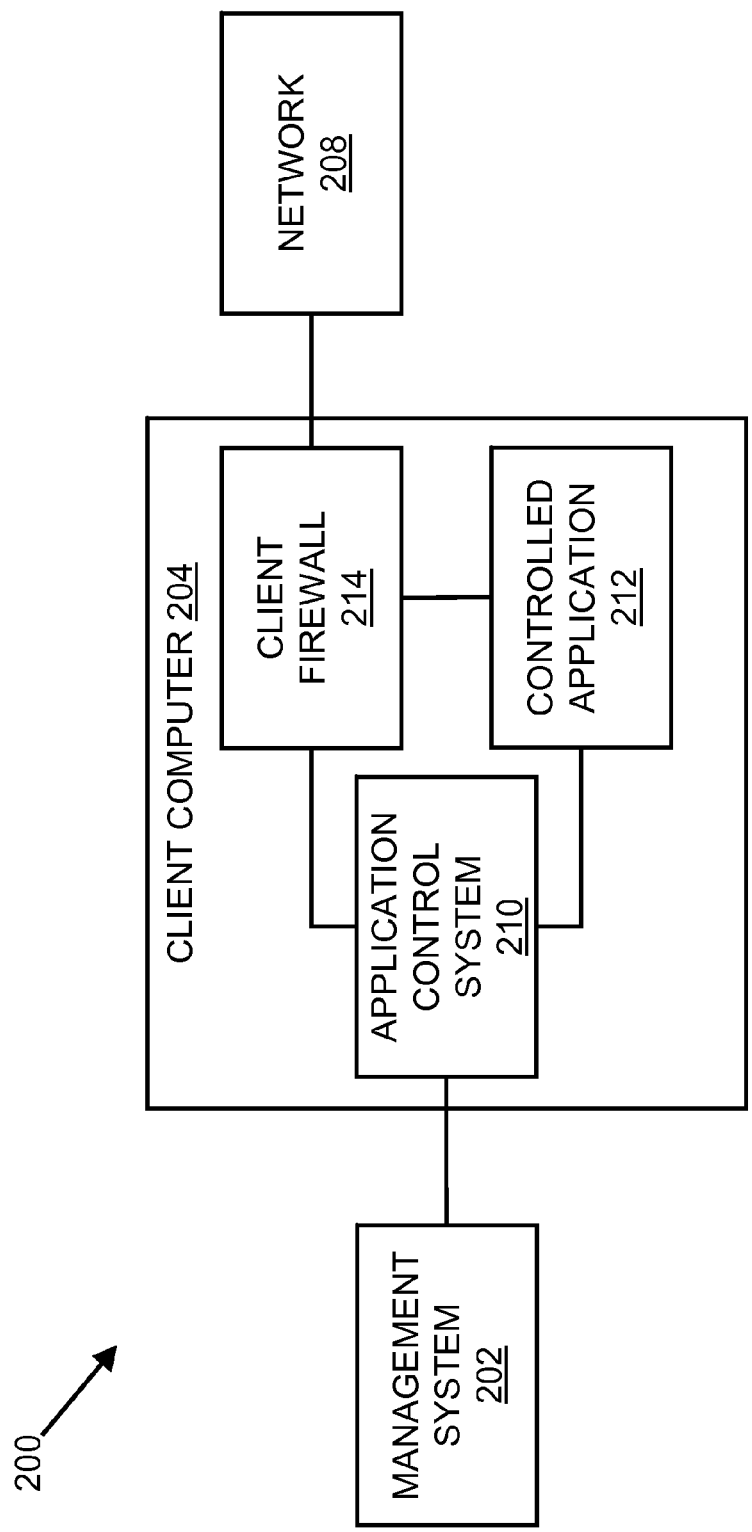
FIG. 2 depicts a system for providing computer-based network quality of service.

FIG. 2 depicts a system for providing computer-based network quality of service. The system 200 includes a management system 202 (e.g. threat management facility 100), a client computer 204, and a network 208. Within the client computer 204 resides an application control system 210, a controlled application 212, and a client firewall 214.

The management system 202 may include any and all computers or computing systems in communication with the application control system 210 for the purpose of updating a database maintained therein.

The database within the application control system 210 may associate applications or application types with particular QoS metrics. From time to time, the contents of the database may be updated by the management system 202.

The controlled application 212 may include any and all applications running on the client computer 204. In embodiments the applications may be accessible to a user, such as and without limitation a desktop application, a command-line application, or the like. In embodiments the controlled application 212 may include a server, a dynamically linked library, a service, a system-level application, or the like.

The application control system 210 may include an application running on the client computer 204 adapted to receive an indication of a controlled application's 212 attempted network access; to receive an indication of a controlled application's 212 instantiation; or the like. In response to receiving such an indication, the application control system may retrieve a QoS policy from its database. Then, the application control system 210 may communicate with the client firewall 214 for the purpose of configuring the firewall 214 to provide a QoS to the controlled application 212, the QoS consistent with the QoS policy. In embodiments the QoS policy may include a firewall policy. It will be understood that a variety of QoS policies are possible.

Embodiments of the application control system 210 may identify the controlled application 212 by using GenoType and/or AppControl technologies of Sophos PLC having headquarters in the UK and the USA.

The client firewall 214 may include an implementation of a firewall running in the client computer 204. The client firewall 214 may regulate communications between the controlled application 212 and the network 208 so as to provide a QoS consistent with the QoS policy. Additionally, the client firewall 214 may provide any and all functions and features of a firewall as described herein and elsewhere. It will be understood that a variety of embodiments of the client firewall 214 are possible.

The network 208 may include any and all packet-switched data networks. In embodiments the network 208 may include the Internet 154, a local area network, a metropolitan area network, a wide area network, and so on. It will be understood that a variety of embodiments of the network 208 are possible.

The controlled application 212 may have a name and be associated with a class. For example and without limitation, the class may be denoted as "core business application," "non-core business application," "entertainment," "productivity," "utility," "mapping application," "voice-over-IP," or the like. A variety of other such examples will be understood and all such examples are within the scope of the present disclosure.

The name and class in association with a firewall policy may be stored in the database of the application control system 202. The firewall policy may be directed at provisioning or configuring QoS elements in the client firewall 214. These QoS elements may without limitation include a packet filter, a packet inspector, a traffic shaper, a traffic policer, a queue or embodiment of a queuing discipline, and so on. It will be understood that a variety of QoS elements are possible.

Embodiments may control the quality of network service provided to a software application by identifying the controlled application 212 at runtime and then enforcing, via the client firewall 214, specific QoS metrics (e.g., throughput, quota, jitter, latency, priority, and so on). This may be achieved by modifying the behavior of the client firewall 214 for a particular controlled application 212 in response to the application's being either uniquely identified or identified as a belonging to a type or class of application. For example and without limitation: A user may launch the controlled application 212. Then, the application control system 210 may identify the controlled application 212. Subsequently the client firewall 214 may apply a QoS restriction to the controlled application 212 based upon the controlled application's type as identified by the application control system 210.

In embodiments determining which client application 212 or class of client application is attempting to access the network 208 may include monitoring at the network layer a connection between the controlled application 212 and a remote application. Based upon the monitoring, the client firewall 214 may observe connection-level parameters (e.g. IP address, port, and so on); may derive information such as destination domain name, protocol, URL; and so on. The firewall 212 may communicate such parameters or information to the application control system 210, which may return the controlled application's 212 name, class, identity, or the like.

In some embodiments, when the controlled application 212 is instantiated or at any time prior to the controlled application 212 being granted access to the network 208, the controlled application 212 may report its name, class, and/or identifier to the client firewall 214 and/or the application control system 210.

In some embodiments the controlled application 212 may be instrumented to provide its name or class, or to provide an identifier that is associated with its name or class. The name or class may be communicated directly to the client firewall 214. Alternatively, the name, class, and/or identifier may be communicated to the application control system 210, which may access its database to retrieve the name or class of the controlled application 212. In any case, instrumenting the controlled application 212 may include providing a dynamically linked library that is loaded by the application 212 (e.g. a Browser Helper Object, a Plug-in, a module, an add-on, or the like), integrating instrumentation into the application 212, or the like.

Based upon the name, class, and/or identifier of the controlled application 212, a QoS policy consisting of one or more QoS parameters may be communicated from the application control system 210 to the client firewall 214. It should be appreciated that selecting and applying the QoS policy in response to a controlled application's 212 class may enable an administrator using the management system 202 to set the policy prior to the existence, installation, or instantiation of new applications of that class.

In some embodiments adding new applications to the database may occur without human intervention. For example and without limitation, when an operating system on the client computer 204 recognizes the installation or initial running of an application, the operating system or an aspect thereof may communicate with the application control system 210 to inform it of the new application. In response to this, the application control system 210 may update its database accordingly.

In any case, when a new release of an application becomes available the database of the application control system 210 may be updated to identify the new variant of the application. In embodiments the name and class of any particular application may remain the same, even when new versions of the application are released. This may ensure (a) that when the application is updated on the client computer 204 the application control system 210 can still identify the application and (b) that the client firewall 214 can continue to apply the same policy to the new version of the controlled application 212 as was being applied to the old version of the controlled application 212 (when appropriate).

In embodiments the QoS that is applied/provided to a controlled application 212 by the client firewall 214 may relate to any and all combinations of the following aspects of quality of service:

Network bandwidth: The bandwidth that the controlled application 212 receives from the network may be limited to a fixed number of bytes per second. Traffic quota: The volume of data transferred with a given time period may be set, for example, to allow a maximum data transfer per unit time. Timed access: The controlled application 212 may be restricted to only have certain access to the network at specific periods of time. Network domain: The QoS may be altered depending upon a network domain being accessed by the controlled application 212. For example and without limitation, this could allow unrestricted access to local intranet addresses, and apply QoS restrictions to public Internet addresses.

In embodiments, administration of QoS may be implemented at different levels of application classification. For instance, administration of QoS may be implemented at a class of application, the name of the application, the version of an application, and the like. In this way, a 'controlled application' may be a controlled class of application, the control of the application as a whole, the control of the application per select application version, the control of the application based on install or upgrade date, the control of the application based on the application being licensed or a trial, and the like. For example, an application may arrive that has the same class (e.g. another media player) but because the application is controlled at the level of class, user intervention is not required, because this class of application is allowed. In another example, the application control may be at the version level, and so even if a user is downloading a new version of a media player that currently exists on the computer, they may be denied based on the policy associated with the version of the media player. It will be appreciated that administration of QoS by application name or class rather than on a per-application-version basis may reduce administration time, as the QoS policy need not be reassigned to a new version of the controlled application 212 when the new version is installed.

Embodiments may be directed at prioritization of certain controlled applications 212 over other controlled applications 212. In other words, a QoS policy may allow a first controlled application 212 to affect the QoS provided to a second controlled application 212. For example and without limitation, a video conferencing application may be given priority access to the network 208 over an application for downloading files. A variety of such examples will be appreciated and all such examples are within the scope of the present disclosure.

Some embodiments may include extensions to a QoS policy that are directed at providing controlled/limited/guaranteed access to computing resources other than the network 208. Such computing resources may include CPU, memory, transactional memory (e.g. RAM), disk space, and so on. In other words, once a controlled application 212 has been identified its access to any and all computing resources of the client computer 204 may be guided by the QoS policy. It will be understood that a variety of systems and methods for controlling/limiting/guaranteeing access to computing resources of a client computer 204 are possible. All such systems and methods are within the scope of the present disclosure.

It will be appreciated that embodiments may enable an administrator to set QoS policy at a central location (e.g. at the management system 202) before the controlled application 212 has ever been executed on a client computer 204. Thus, applying the QoS policy to the controlled application 212 may occur automatically when the controlled application 212 is used including without limitation when the controlled application 212 is used for the first time.

FIG. 3 depicts a flow diagram of a method for controlling network bandwidth consumed by a client computing facility. In embodiments the client computing facility may be the client computer 204. The method 300 begins with step 302 and continues to step 304, which depicts an act of identifying which of a plurality of software applications operating through the client computing facility is requesting network access. In embodiments, the client firewall 214 may detect that the controlled application 212 is requesting or attempting network access. As described hereinabove and elsewhere, the application control system 210 may identify the controlled application 212, the client firewall 214 may identify the controlled application 212, the controlled application 212 may identify itself or announce its identity, or any and all combinations of the foregoing. In embodiments, identifying the controlled application 212 may include identifying a class to which the controlled application 212 belongs.

In embodiments, step 308 depicts an act of confirming that the requesting software application is permitted restricted bandwidth when making network communications. The controlled application 212 may be the requesting software application. In any case, this act may involve accessing a network access policy that is resident on the client computing facility. In embodiments this may include the application control system 210 accessing its database to retrieve the network access policy (e.g., a QoS parameter, metric, policy or the like) that is associated with the controlled application 212. Alternatively, this act may involve accessing a network access policy that is remote from the client computing facility. In embodiments this may include communications with the management system 202 or another computing facility on the network 208 in order for the application control system 210 to receive the access policy.

In embodiments, step 310 depicts an act of allowing the requesting software application to make the network communications through a bandwidth restricted network connection. In embodiments the bandwidth restricted network connection may be regulated at the client firewall 214 by controlling a rate at which individual data components of the network communication are sent and received. In embodiments the act of allowing may further include regulating the bandwidth of the bandwidth restricted network connection based upon time of day. For example and without limitation, the bandwidth may be regulated in one way at a first time of day and regulated in another way at a second time of day. In embodiments the act of allowing may further include regulating the bandwidth of the bandwidth restricted network connection based upon a predetermined quota. For example and without limitation, the quota may be a fixed number of gigabytes and communications between the controlled application 212 and the network 208 may be denied once said number of gigabytes has been communicated between the application 212 and the network 208. Alternatively, a different network access policy may be applied once communications between the application 212 and the network reaches the quota. In some embodiments the quota may be for a predetermined time period. A variety of examples will be appreciated and all such examples are within the scope of the present disclosure.

The method 300 may end at step 312.

FIG. 4 depicts a flow diagram of a method for controlling network bandwidth. The method begins at step 402 and continues to step 404, which may depict an act of providing to a plurality of client computing facilities a network accessibility bandwidth quota for a restricted availability software application operated through a client computing facility. In embodiments the management system 202 may be operatively coupled to a plurality of client computers 204, and may provide the network accessibility bandwidth quota (i.e., a QoS parameter, metric, policy, or the like) to the plurality of client computers 204. In embodiments the quota may establish a quota within certain timeframes in a day. Additionally or alternatively, the quota may be established in accordance with a corporate policy. In some embodiments the corporate policy may be maintained, at least in part, through a network based threat management facility. For example and without limitation, the management system 200 may be an element of the threat management facility 100. In some embodiments the quota may be updated through a network based threat management facility in accordance with an updated corporate policy.

In embodiments the restricted availability software application may include the controlled application 212 and the client computing facilities may include client computers 204. Without limitation, the restricted availability software application may be a server based software application, a client based software application, a gaming software application, an instant messaging software application, a VoIP software application, a video software application, a music software application, and so on. It will be understood that a variety of kinds of restricted availability software applications are possible.

Step 404 may depict the act of causing each of the plurality of client computing facilities to regulate a bandwidth restricted network connection accessed by the restricted availability software application in accordance with the network accessibility bandwidth quota. In embodiments this act of causing may involve the application control system 210 configuring the client firewall 214 to regulate the bandwidth of a connection between the controlled application 212 and the network 208.

The method 400 may end at step 410.

Figure 5:
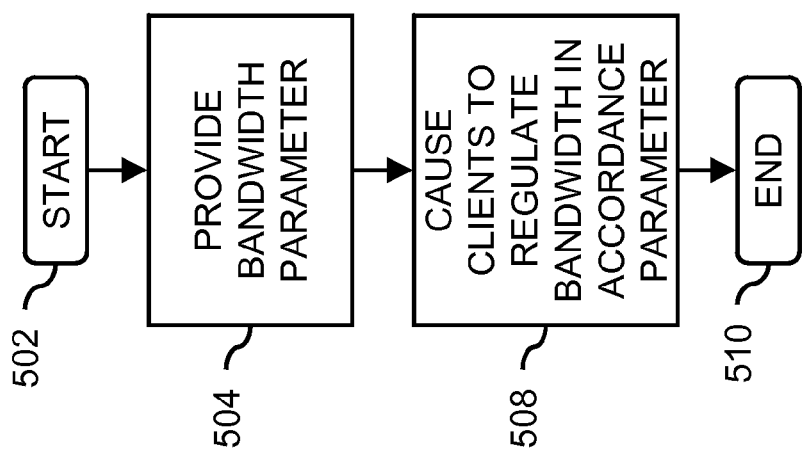
FIG. 5 depicts a flow diagram of a method of controlling network bandwidth.

FIG. 5 depicts a flow diagram of a method of controlling network bandwidth. The method begins at step 502 and continues to step 504, which may depict the act of providing to a plurality of client computing facilities a network accessibility bandwidth parameter for a restricted availability software application operated through a client computing facility. In embodiments the restricted availability software application may include the controlled application 212 and the client computing facilities may include client computers 204. In embodiments a QoS policy may include the network accessibility bandwidth parameter. The network accessibility parameter may relate to currently available network bandwidth. For example and without limitation, the network accessibility parameter may specify "X % of currently available network bandwidth" or the like. The network accessibility parameter may relate to time of day. For example and without limitation, the network accessibility parameter may specify "X amount of bandwidth is available between 10:00 and 12:00 local time." In embodiments the act of providing may include the management system 202 communicating the network accessibility bandwidth parameter to a plurality of client computers 204.

Step 508 may depict the act of causing each of the plurality of client computing facilities to regulate a bandwidth restricted network connection accessed by the restricted availability software application in accordance with the network accessibility parameter. In embodiments this act of causing may involve the application control system 210 configuring the client firewall 214 to regulate the bandwidth of a connection between the controlled application 212 and the network 208.

The method 500 may end at step 510.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Embodiments of methods described herein and elsewhere may include computer program products stored on physical storage media in computer-readable physical storage formats. Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method of operating a client computing facility to control available bandwidth to applications, the method comprising:
   receiving a notification of a request for network access by an application executing on the client computing facility from a firewall of the client computing facility that is connected to a data network;
   identifying the application as an identified application according to two or more of a type of the application, a name of the application, and a version of the application, thereby providing an identified application;
   determining a permitted bandwidth including a maximum allowable bandwidth for the identified application based upon a network access policy for the identified application, wherein the network access policy is administered according to a corporate policy maintained by a remote threat management facility;
   configuring the firewall of the client computing facility to regulate a bandwidth between the identified application and the data network according to the permitted bandwidth and according to a predetermined quota;
   allowing the application to establish network communications through the firewall according to the request for network access; and
   applying a different network access policy to the network communications when usage by the application reaches the predetermined quota, the different network access policy selected by the remote threat management facility according to the corporate policy to address a threat or a policy violation detected by the remote threat management facility.

2. The method of claim 1, wherein the network access policy is resident on the client computing facility.

3. The method of claim 1, wherein the network access policy is stored in the threat management facility remote from the client computing facility, the method further comprising accessing the threat management facility to retrieve the permitted bandwidth for the application.

4. The method of claim 1, wherein the firewall is configured to control a rate at which data is sent and received through the network communications.

5. The method of claim 1, wherein the permitted bandwidth varies based on a time of day.

6. The method of claim 1, wherein the permitted bandwidth varies based on a predetermined quota.

7. The method of claim 6, wherein the predetermined quota is a predetermined quota for a predetermined time period.

8. A method of controlling network bandwidth usage comprising:
   providing to a plurality of client computing facilities a quota for a maximum allowable data communication by the plurality of client computing facilities while using a restricted availability software application, the quota shared among all of the plurality of client computing facilities, and the quota based upon a network access policy for the restricted availability software application according to two or more of a type of the restricted availability software, a name of the restricted availability software, and a version of the restricted availability software, wherein the quota and the network access policy are further determined according to a corporate policy maintained through a network based threat management facility;
   causing each of the plurality of client computing facilities to configure a local firewall to regulate a network connection used by the restricted availability software application in accordance with the quota; and
   causing each of the plurality of client computing facilities to reconfigure the local firewall to regulate the network connection used by the restricted availability software application in accordance with a different network access policy when the quota has been reached, wherein the different network access policy is selected by the network based threat management facility according to the corporate policy to address a threat or a policy violation detected by the network based network threat management facility.

9. The method of claim 8, wherein the quota establishes a quota within certain timeframes in a day.

10. The method of claim 8, wherein the restricted availability software application is a server based software application.

11. The method of claim 8, wherein the restricted availability software application is a client based software application.

12. The method of claim 8, wherein the restricted availability software application is a gaming software application.

13. The method of claim 8, wherein the restricted availability software application is an instant messaging software application.

14. The method of claim 8, wherein the restricted availability software application is a VoIP software application.

15. The method of claim 8, wherein the restricted availability software application is a video software application.

16. The method of claim 8, wherein the restricted availability software application is a music software application.

17. A method of controlling network bandwidth, comprising:

provinding to a plurality of client computing facilities a network accessibility bandwidth parameter from a network access policy managed by a threat management facility, the network accessibility bandwidth parameter shared among the plurality of client computing facilities and the network accessibility bandwidth parameter specifying a maximum amount of bandwidth for use of a restricted availability software application by one or more of the plurality of client computing facilities through a network, wherein the network accessibility parameter is based on a maximum allowable bandwidth according to two or more of a type of the restricted availability software, a name of the restricted availability software, and a version of the restricted availability software as specified in the network access policy;

causing each of the plurality of client computing facilities to configure a local firewall to regulate a connection to the network accessed by the restricted availability software application in accordance with the network accessibility bandwidth parameter; and causing each of the plurality of client computing facilities to reconfigure the local firewall to regulate the network connection used by the restricted availability software application in accordance with a different network access policy when a predetermined quota for the restricted availability software application has been reached, wherein the different network access policy is selected by the threat management facility according to a corporate policy to address a threat or a policy violation detected by the threat management facility.

18. The method of claim 17, wherein the network accessibility bandwidth parameter provides a variable bandwidth that relates to currently available network bandwidth.

19. The method of claim 17, wherein the network accessibility bandwidth parameter provides a variable bandwidth that relates to a time of day.

* * * * *